(12) United States Patent
Kikuchi

(10) Patent No.: US 8,594,001 B2
(45) Date of Patent: Nov. 26, 2013

(54) PACKET COMMUNICATION SYSTEM AND ITS COMMUNICATION METHOD, BASE STATION, AND MOBILE STATION

(75) Inventor: Tohru Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1285 days.

(21) Appl. No.: 11/771,627

(22) Filed: Jun. 29, 2007

(65) Prior Publication Data

US 2008/0031170 A1 Feb. 7, 2008

(30) Foreign Application Priority Data

Aug. 2, 2006 (JP) .................................. 2006/210426

(51) Int. Cl.
*H04B 7/00* (2006.01)
(52) U.S. Cl.
USPC ........... 370/310; 370/329; 370/341; 455/450; 455/451; 455/452.1; 455/452.2; 455/453
(58) Field of Classification Search
USPC .................. 370/310, 329, 341; 455/450, 451, 455/452.1, 452.2, 453, 456.1–456.6
See application file for complete search history.

(56) References Cited

U.S. PATENT DOCUMENTS

| | | | |
|---|---|---|---|
| 7,012,910 B2* | 3/2006 | Takeuchi et al. | 370/335 |
| 7,773,998 B2* | 8/2010 | Ikegami | 455/452.2 |
| 2004/0185863 A1 | 9/2004 | Ogami | |
| 2005/0130598 A1 | 6/2005 | Dowling | |
| 2006/0199548 A1* | 9/2006 | Saraby | 455/67.13 |

FOREIGN PATENT DOCUMENTS

| | | |
|---|---|---|
| CN | 1582041 A | 2/2005 |
| EP | 1513300 A2 | 3/2005 |
| GB | 2271486 A | 4/1994 |
| JP | 07-066764 A | 3/1995 |
| JP | 2000-341204 A | 12/2000 |
| JP | 2002-171287 A | 6/2002 |
| JP | 2004-064538 A | 2/2004 |
| JP | 2005-086216 A | 3/2005 |
| JP | 2005-341311 A | 12/2005 |

OTHER PUBLICATIONS

Extended European Search Report dated Mar. 15, 2012 in Application No. EP 07110851.8.

* cited by examiner

*Primary Examiner* — Wayne Cai
(74) *Attorney, Agent, or Firm* — Sughrue Mion, PLLC

(57) ABSTRACT

A packet communication system for packet communication between a base station and plural mobile stations is provided. The system includes: a base station including a reception quality obtaining unit which obtains reception quality of uplink signals or reception quality of downlink signals, location information obtaining unit which obtains location information of a mobile station, a location information data base in which certainty is registered as weighting coefficient, where the certainty of reception quality is obtained from combination of the prescribed location within moving range of a mobile station and propagation environment for the location, and a mobile station selection unit which selects a mobile station intended to transmit or receive signals based on a result of multiplying reception quality obtained by reception quality obtaining unit, by weighting coefficient corresponding to location information of a mobile station which is obtained from the location information data base.

16 Claims, 9 Drawing Sheets

FIG. 3

| PARAMETER | REMARKS |
|---|---|
| LOCATION INFORMATION | LOCATION INFORMATION BY GPS |
| TIME | CURRENT TIME (TIME ZONE) |
| WEATHER | CURRENT WEATHER |
| TEMPERATURE | CURRENT TEMPERATURE |
| DATE | DAY OF THE WEEK, HOLIDAY, ETC. |

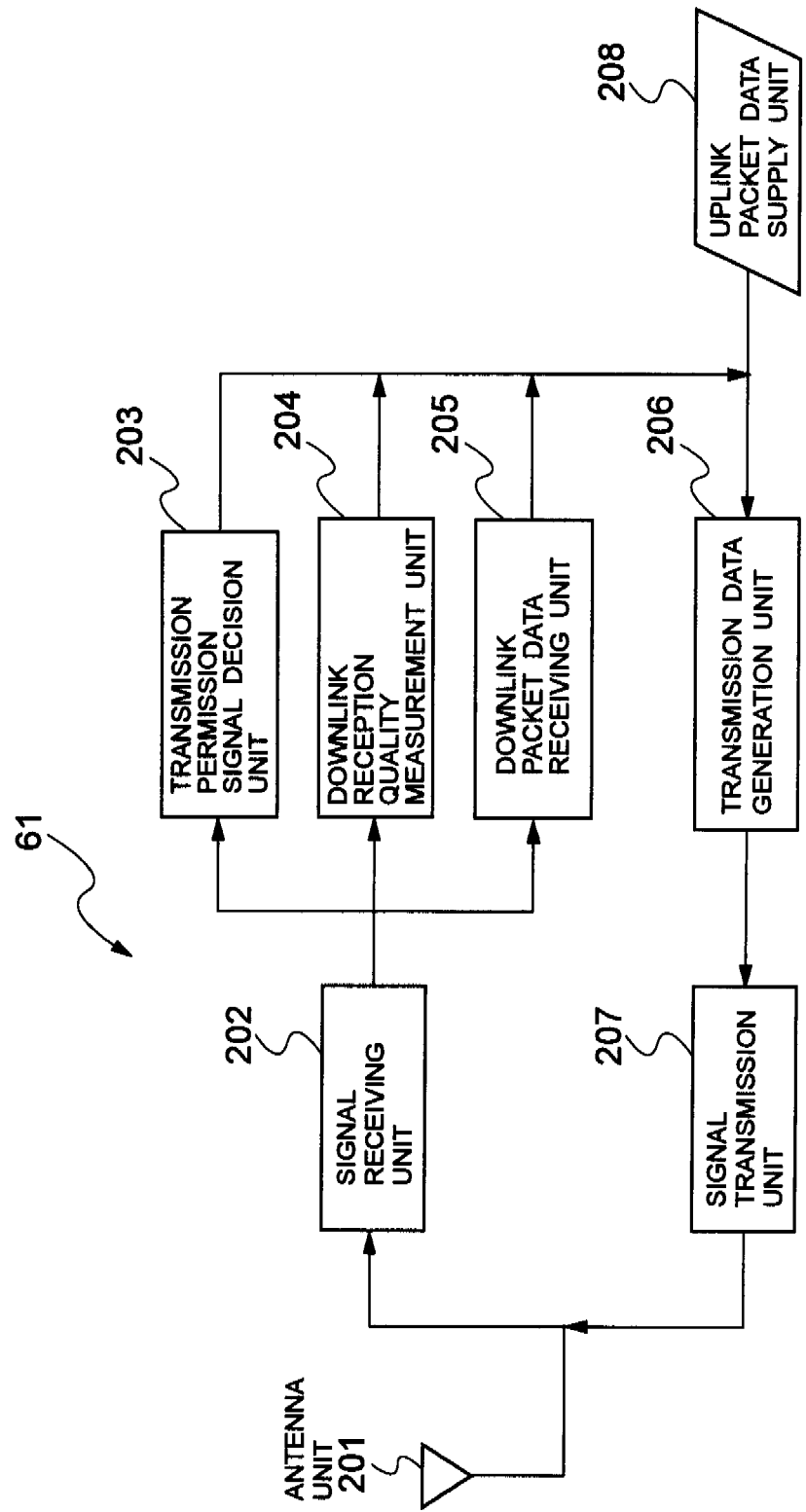

PACKET COMMUNICATION SYSTEM AND ITS COMMUNICATION METHOD, BASE STATION, AND MOBILE STATION

INCORPORATION BY REFERENCE

This application is based upon and claims the benefit of priority from Japanese patent application No. 2006-210426, filed on Aug. 2, 2006, the disclosure of which is incorporated herein its entirety by reference.

BACKGROUND OF THE INVENTION

1. Field of the Invention

The present invention relates to a packet communication system and its communication method, base station, and mobile station, and particularly, to a scheduling method of uplink and downlink packet communication in the packet communication system, specifically, to a scheduling method of a wireless base station for a wireless mobile station.

2. Description of the Related Art

In the packet communication of wireless mobile communication, it is common practice to schedule uplink communication (from a mobile station to a base station) using the reception quality of received uplink signal. In this case, a mobile station knows the presence of data to be transmitted. Thus, when there is data to be transmitted from the mobile station, the presence of data to be transmitted is notified with a reservation packet from the mobile station to a base station, the base station schedules the mobile station, from which the reservation packet has been received, based on the reception quality of received uplink signal, and notifies transmission permission, so that the mobile station transmits the data to the base station.

To the contrary in downlink communication (from a base station to a mobile station) for plural mobile stations, it is common practice to perform scheduling using the reception quality of received downlink signal. In this case, because a base station has data to be transmitted, if parameters (such as downlink reception quality) necessary for scheduling are obtained, the base station can schedule a mobile station and transmit the data.

An embodiment of such packet communication system is illustrated in FIG. 8 and FIG. 9. FIG. 8 is a configuration diagram of an embodiment of a base station in the related packet communication system, and FIG. 9 is a configuration diagram of a mobile station in the related packet communication system.

When uplink packet communication is performed, in a base station 51 illustrated in FIG. 8, an antenna unit 101 receives signals from a mobile station, not illustrated, and a signal receiving unit 102 separates the signals to signals of each mobile station and converts the signals to base band signals. Each of base band signals separated for each mobile station is inputted to a mobile station registration decision unit 103 and an uplink reception quality measurement unit 105.

The mobile station registration decision unit 103 determines the presence of reservation packet transmission from mobile stations, and notifies that the mobile station from which the reservation packet has been received has packet data to be transmitted to an information management unit 108 of each mobile station.

The uplink reception quality measurement unit 105 measures the uplink signal reception quality of each mobile station, and notifies the result to the information management unit 108 of each mobile station.

The information management unit 108 of each mobile station manages the presence of packet data and the uplink signal reception quality of each mobile station, and notifies information on the mobile station which has packet data to a scheduling processing unit 109.

The scheduling processing unit 109 obtains the priority of each mobile station from the uplink signal reception quality, selects the mobile station to which transmission permission is provided, and notifies the result to a signal transmission unit 110.

The signal transmission unit 110 generates signals for the mobile station notified from the scheduling processing unit 109, and transmits transmission permission signals through the antenna unit 101.

In a mobile station 61 illustrated in FIG. 9, a signal receiving unit 202 converts signals received by an antenna unit 201 to base band signals. The base band signals are inputted to a transmission permission signal decision unit 203.

The transmission permission signal decision unit 203 determines the presence of the transmission permission signals from the base station 51. An uplink packet data supply unit 208 notifies to a transmission data generation unit 206 when packet data exists.

The transmission data generation unit 206 notifies a signal transmission unit 207 to transmit a reservation packet when new packet data exists, and notifies the packet data from the uplink packet data supply unit 208 to the signal transmission unit 207 when the reservation packet has been transmitted and the transmission permission signals is notified from the base station 51.

The signal transmission unit 207 generates signals for the base station 51 from information notified from the transmission data generation unit 206, and transmits uplink signals through the antenna unit 201.

Next, when the downlink packet communication is performed, in the base station 51 illustrated in FIG. 8, the antenna unit 101 receives signals from the mobile station 61, and the signal receiving unit 102 separates the signals to signals of each mobile station 61 and converts the signals to base band signals. The base band signals of each mobile station 61 are inputted to the mobile station registration decision unit 103 and a downlink reception quality receiving unit 104.

The mobile station registration decision unit 103 determines from the presence of signals received from the mobile station 61 whether or not it is possible to transmit to the mobile station 61, and if possible, notifies the information to the information management unit 108 of each mobile station 61.

The downlink reception quality receiving unit 104 extracts the reception quality of downlink signal receiving included in signals received from the mobile station 61, and notifies it to the information management unit 108 of each mobile station 61.

The information management unit 108 of each mobile station 61 manages information whether or not it is possible to transmit to each mobile station 61, and the downlink signal reception quality, and notifies them to the scheduling processing unit 109. A downlink packet data supply unit 111 notifies the presence of data to be transmitted to each mobile station 61 to the scheduling processing unit 109.

The scheduling processing unit 109 schedules the mobile station 61 which has data to be transmitted based on the downlink signal reception quality, determines the mobile station 61 to which packet data is transmitted, and notifies information on the mobile station 61 to which packet data is transmitted and data to be transmitted to the signal transmission unit 110.

The signal transmission unit 110 generates signals for the mobile station 61 to which packet data is transmitted based on information notified from the scheduling processing unit 109, and transmits downlink signals through the antenna unit 101.

In the mobile station 61 illustrated in FIG. 9, the antenna unit 201 receives signals from the base station 51, and the signal receiving unit 202 converts the signals to base band signals. The base band signals are inputted to a receiving signal quality measurement unit 204. The receiving signal quality measurement unit 204 measures the reception quality of downlink signal receiving, and notifies the measurement result to the transmission data generation unit 206.

The transmission data generation unit 206 notifies the downlink signal reception quality to the signal transmission unit 207. The signal transmission unit 207 generates signals for the base station 51, and transmits uplink signals through the antenna unit 201.

When downlink packet is transmitted by the scheduling processing in the base station 51, the antenna unit 201 receives signals from the base station 51, the signal receiving unit 202 converts the signals to base band signals, then the downlink packet data receiving unit 205 receives downlink packet data.

One example of the inventions associated with the above related technology is disclosed in the Patent Document 1 (Japanese Patent Laid-Open No. 2005-341311).

On the other hand, the wireless packet communication system is disclosed which detects the location of a mobile station according to the distance between a mobile station and a base station, generates a function according to the location, and performs transmission scheduling of down link packet based on the function (refer to the Patent Document 2 (Japanese Patent Laid-Open No. 2002-171287 (paragraph: 0061 to 0063, 0067, and FIG. 2)). The Patent Document 2 describes that the function can be changed according to the date and the weather conditions.

However, when the scheduling is performed based on the signal reception quality in the packet communication of the related wireless mobile communication (including the invention disclosed in the Patent Document 1), there is such a problem that effective scheduling cannot be performed because time-dependent variation of signal propagation channel may be large due to environment, location, etc., and the propagation channel may change between the time when the reception quality is measured and the time when the scheduling is performed.

On the other hand, the invention disclosed in the Patent Document 2 is common to the present invention in that transmission scheduling of link packet is performed based on location of a mobile station. However, while the invention disclosed in the Patent Document 2 generates a function based on the transmission rate, the present invention generates coefficients based on the certainty of the reception quality, so that the configurations of both the inventions are very different each other in such a way that the weighting is performed using the location information.

BRIEF SUMMARY OF THE INVENTION

It is an object of the present invention to provide a packet communication system and its communication method, base station and mobile station which can perform the scheduling based on the signal reception quality independently of the time-dependent variation of signal propagation channel due to environment, location, etc.

An exemplary aspect of the invention is a packet communication system for packet communication between a base station and plural mobile stations, the base station is characterized by including reception quality obtaining unit which obtains the reception quality of uplink signals (signals in the direction from a mobile station to a base station) or the reception quality of downlink signals (signals in the direction from a base station to a mobile station), location information obtaining unit which obtains the location information of the mobile station, a location information data base in which the certainty is registered as weighting coefficient, the certainty of the reception quality being obtained from combination of the prescribed location within moving range of the mobile station and propagation environment for the location, and mobile station selection means of selecting the mobile station intended to transmit or receive signals based on a result of multiplying the reception quality obtained by the reception quality obtaining means, by the weighting coefficient corresponding to the location information of the mobile station which is obtained from the location information data base.

An exemplary aspect of the invention is a packet communication method for packet communication between a base station and plural mobile stations in the packet communication system, including in the base station, obtaining reception quality of uplink signals (signals in the direction from a mobile station to a base station) or the reception quality of downlink signals (signals in the direction from a base station to a mobile station), obtaining location information of the mobile station, referring to a location information data base in which the certainty is registered as weighting coefficient, the certainty of the reception quality being obtained from combination of the prescribed location within moving range of the mobile station and propagation environment for the location, and selecting the mobile station intended to transmit or receive signals based on result of multiplying the reception quality obtained at the process of obtaining the reception quality, by the weighting coefficient corresponding to the location information of the mobile station which is obtained from the location information data base.

An exemplary aspect of the invention is a base station in the packet communication system for packet communication between a base station and plural mobile stations, including reception quality obtaining unit which obtains the reception quality of uplink signals (signals in the direction from a mobile station to a base station) or the reception quality of downlink signals (signals in the direction from a base station to a mobile station), location information obtaining unit which obtains the location information of the mobile station, a location information data base in which the certainty is registered as weighting coefficient, the certainty of the reception quality being obtained from combination of prescribed location within moving range of the mobile station and propagation environment for the location, and mobile station selection unit which selects the mobile station intended to transmit or receive signals based on a result of multiplying the reception quality obtained by the reception quality obtaining unit, by the weighting coefficient corresponding to the location information of the mobile station which is obtained from the location information data base.

An exemplary aspect of the invention is a mobile station in the packet communication system for packet communication between a base station and plural mobile stations, and including a transmission unit which transmits the reception quality of downlink signals (signals in the direction from a base station to a mobile station) and the location information of the mobile station to the base station, and is selected in the base station based on the reception quality and the location information.

Here, operations of the present invention will be described. In the packet scheduling which the base station performs for the plural mobile stations, each mobile station transmits the location information of the mobile station to the base station, the base station obtains variation probability of a propagation channel estimated from the location information and the environment whose data base has been made previously, multiplies the reception quality by it as weighting coefficient, sets it to a scheduling parameter, and realizes a scheduling method in consideration of the location information. That is, according to the present invention, risk of time-dependent variation of a propagation channel estimated based on the location information of the mobile station in addition to the reception quality of signals is set to a scheduling parameter, so that it is possible to perform efficient scheduling.

According to the present invention, it is possible to perform scheduling based on the signal reception quality by including the above configuration independently of the time-dependent variation of signal propagation channel due to environment, location, etc.

BRIEF DESCRIPTION OF THE DRAWINGS

FIG. 3 is an explanatory diagram of an exemplary embodiment of content of a location information data base;

FIG. 9 is a configuration diagram of an exemplary embodiment of a mobile station in a related packet communication system.

DETAILED DESCRIPTION OF THE PREFERRED EMBODIMENTS

The exemplary embodiments of the present invention will be described in detail below referring to the accompanying drawings. Because the present invention can be applied to both uplink packet communication and downlink packet communication, each case will be described.

[First Exemplary Embodiment]

Figure 1:
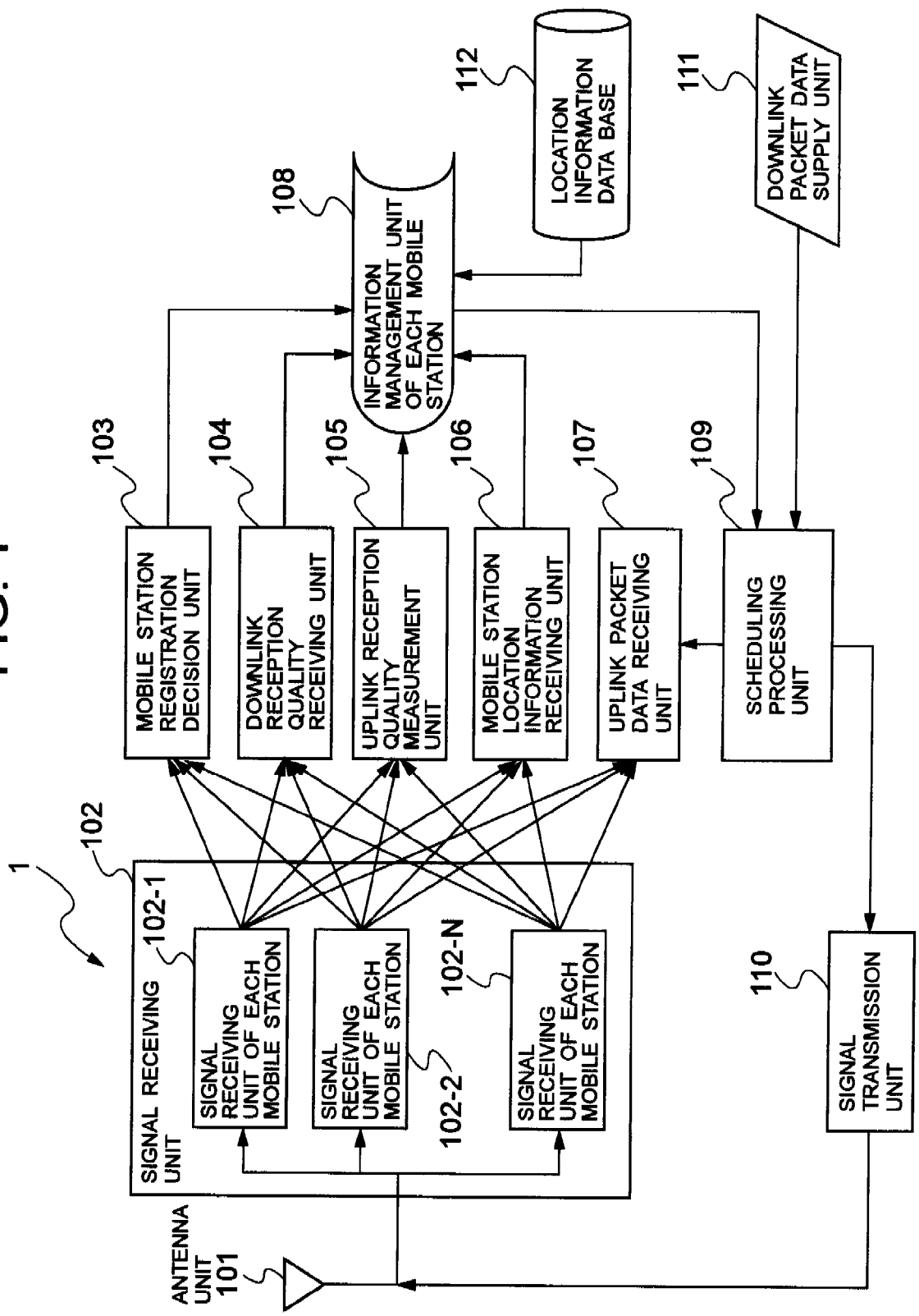
FIG. 1 is a configuration diagram of an exemplary embodiment of a base station in a packet communication system according to the present invention.
Figure 8:
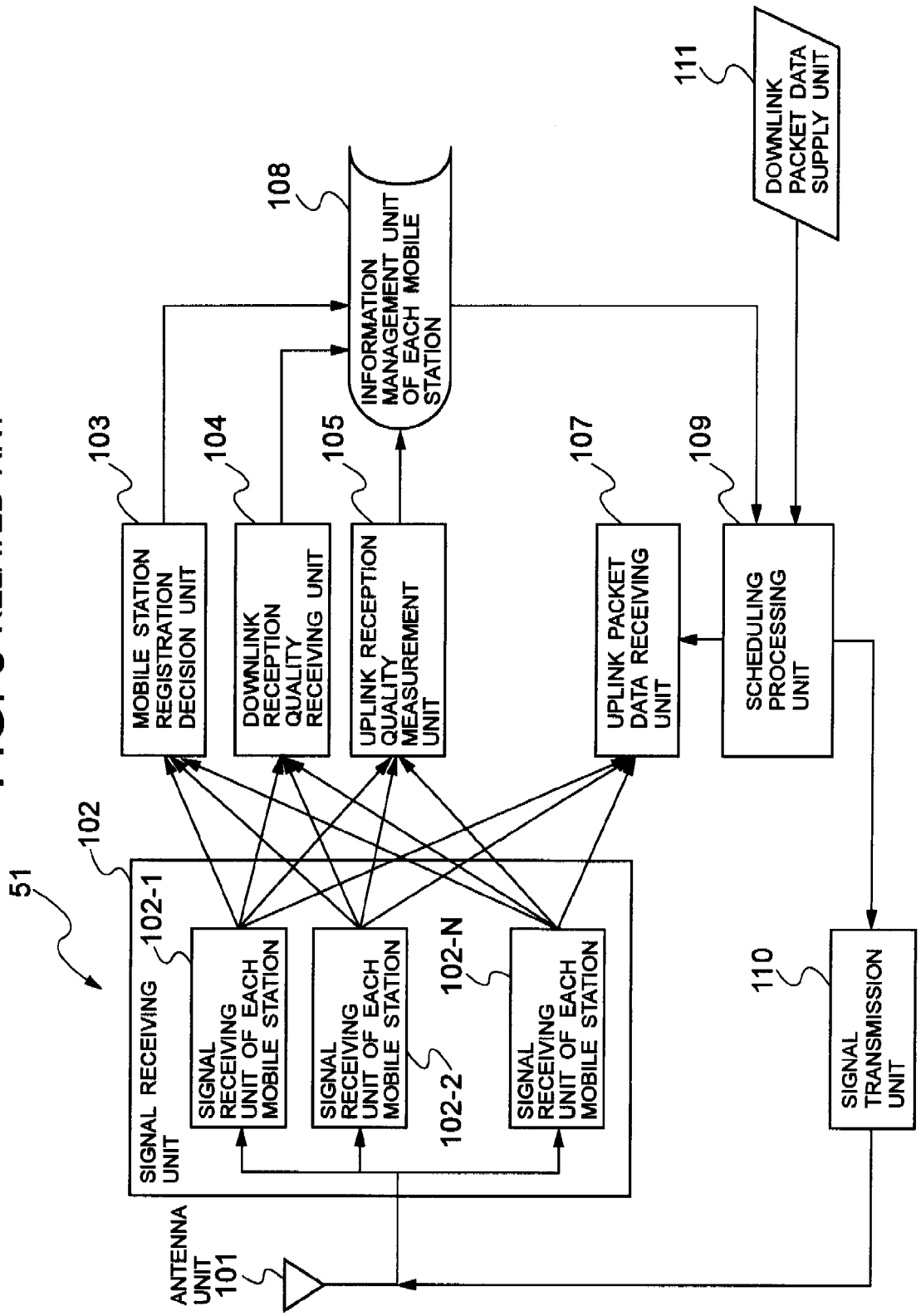
FIG. 8 is a configuration diagram of an exemplary embodiment of a base station in a related packet communication system.

First, the uplink packet communication will be described. FIG. 1 is a configuration diagram of an exemplary embodiment of the base station in the packet communication system according to the present invention. Meanwhile, like numerals are provided to components in FIG. 1 similar to those in FIG. 8, and the description will be omitted.

Referring to FIG. 1, the base station 1 includes an antenna unit 101, a signal receiving unit 102, a mobile station registration decision unit 103, a downlink reception quality receiving unit 104, an uplink reception quality measurement unit 105, a mobile station location information receiving unit 106, an uplink packet data receiving unit 107, an information management unit 108 of each mobile station, a scheduling processing unit 109, a signal transmission unit 110, a downlink packet data supply unit 111, and a location information data base 112.

The signal receiving unit 102 is configured to include signal receiving units of each mobile station 102-1 to 102-N (N: positive integer).

In the base station 1 illustrated in FIG. 1, signals received by the antenna unit 101 are received by the signal receiving unit 102 and are separated to base band signals of each mobile station in the signal receiving unit 102. Each of base band signals separated to each mobile station is inputted to the mobile station registration decision unit 103, the uplink reception quality measurement unit 105, and the mobile station location information receiving unit 106.

The mobile station registration decision unit 103 determines the presence of a reservation packet transmission from the mobile station, and notifies to the information management unit 108 of each mobile station that the mobile station from which a reservation packet has been received has packet data to be transmitted.

The uplink reception quality measurement unit 105 measures the uplink signal reception quality of each mobile station, and notifies the result to the information management unit 108 of each mobile station. The mobile station location information receiving unit 106 receives the location information of each mobile station notified by the uplink receiving signals, and notifies the received location information to the information management unit 108 of each mobile station.

The information management unit 108 of each mobile station extracts the weighting coefficient based on the location information from the location information data base 112 based on the notified location information, and notifies the weighting coefficient, the presence of the mobile station having packet data to be transmitted and the uplink signal reception quality information to the scheduling processing unit 109.

The scheduling processing unit 109 calculates the priority of each mobile station from the notified information, selects the mobile station which has the high priority, and notifies the result to the uplink packet data receiving unit 107 and the signal transmission unit 110.

The signal transmission unit 110 generates transmission permission signals for the selected mobile station, and transmits signals through the antenna unit 101. Because packet data is transmitted from the mobile station permitted for the transmission, the antenna unit 101 receives signals, the signal receiving unit 102 converts the signals to the base band signals, and the uplink packet data receiving unit 107 receives packet data from the mobile station.

Figure 2:
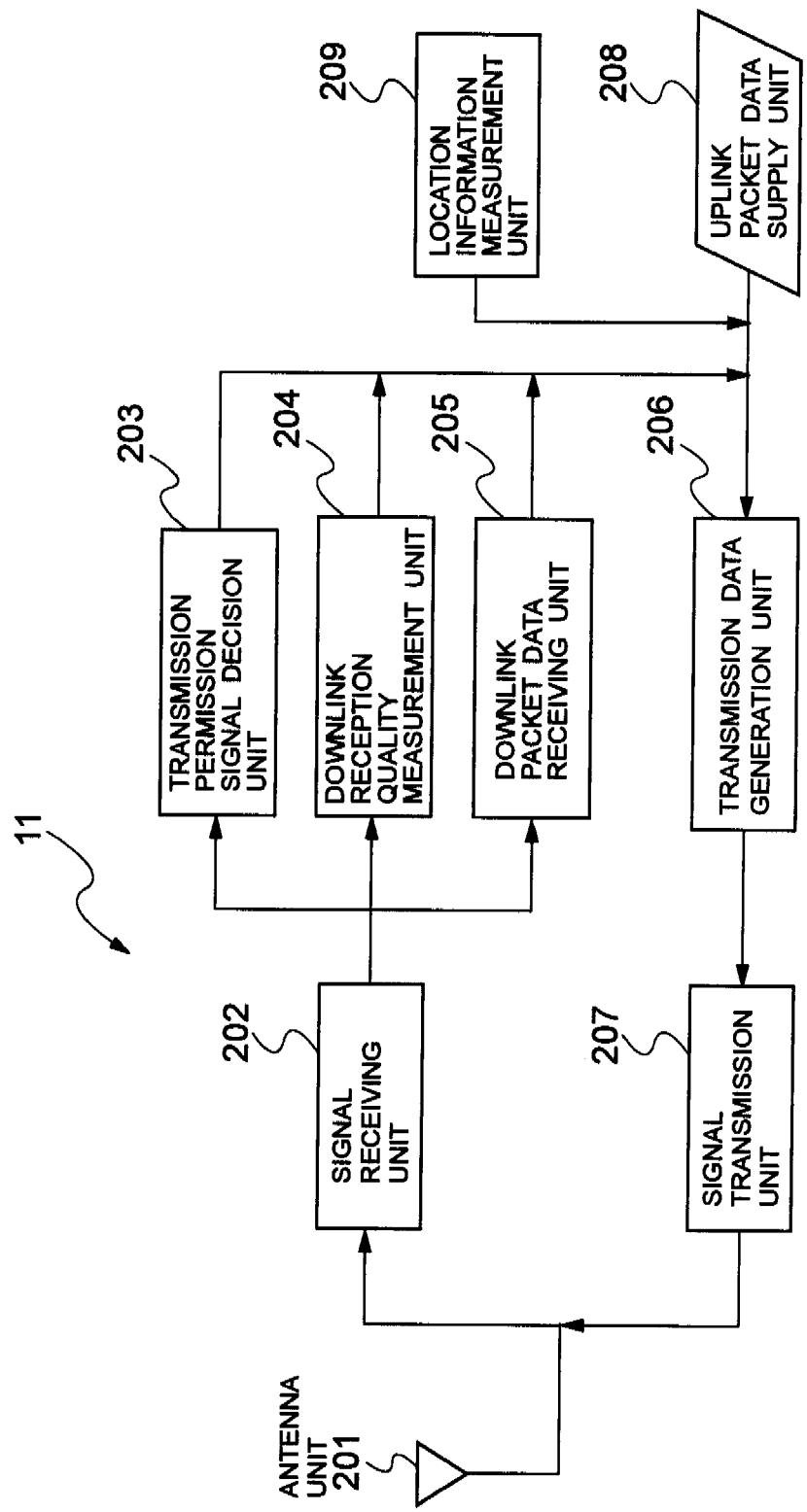
FIG. 2 is a configuration diagram of an exemplary embodiment of a mobile station in a packet communication system according to the present invention.

FIG. 2 is a configuration diagram of an exemplary embodiment of a mobile station in the packet communication system according to the present invention. Meanwhile, like numerals are provided to components in FIG. 2 similar to those in FIG. 9, and the description will be omitted.

Referring to FIG. 2, the mobile station 11 includes an antenna unit 201, a signal receiving unit 202, a transmission permission signal decision unit 203, a downlink reception quality measurement unit 204, a downlink packet data receiving unit 205, a transmission data generation unit 206, a signal transmission unit 207, an uplink packet data supply unit 208, and a location information measurement unit 209.

In the mobile station 11 illustrated in FIG. 2, signals inputted to the antenna unit 201 are converted to base band signals by the signal receiving unit 202. The base band signals received by the signal receiving unit 202 are inputted to the transmission permission signal decision unit 203.

The transmission permission signal decision unit 203 determines that the transmission permission signal has been notified by downlink signals, and notifies the decision result to the transmission data generation unit 206. The uplink packet data supply unit 208 notifies that transmission data exists to the transmission data generation unit 206 when uplink transmission data exists. The location information measurement unit 209 measures the location information of the mobile station 11 itself with GPS, etc., and notifies the measured location information to the transmission data generation unit 206.

The transmission data generation unit 206 generates a reservation packet, and notifies it to the signal transmission unit 207 when the location information of the mobile station 11 and data to be transmitted exist and the reservation packet has not been transmitted. The signal transmission unit 207 generates signals to be transmitted to the base station 1, and transmits uplink signals from the antenna unit 201.

Figure 4:
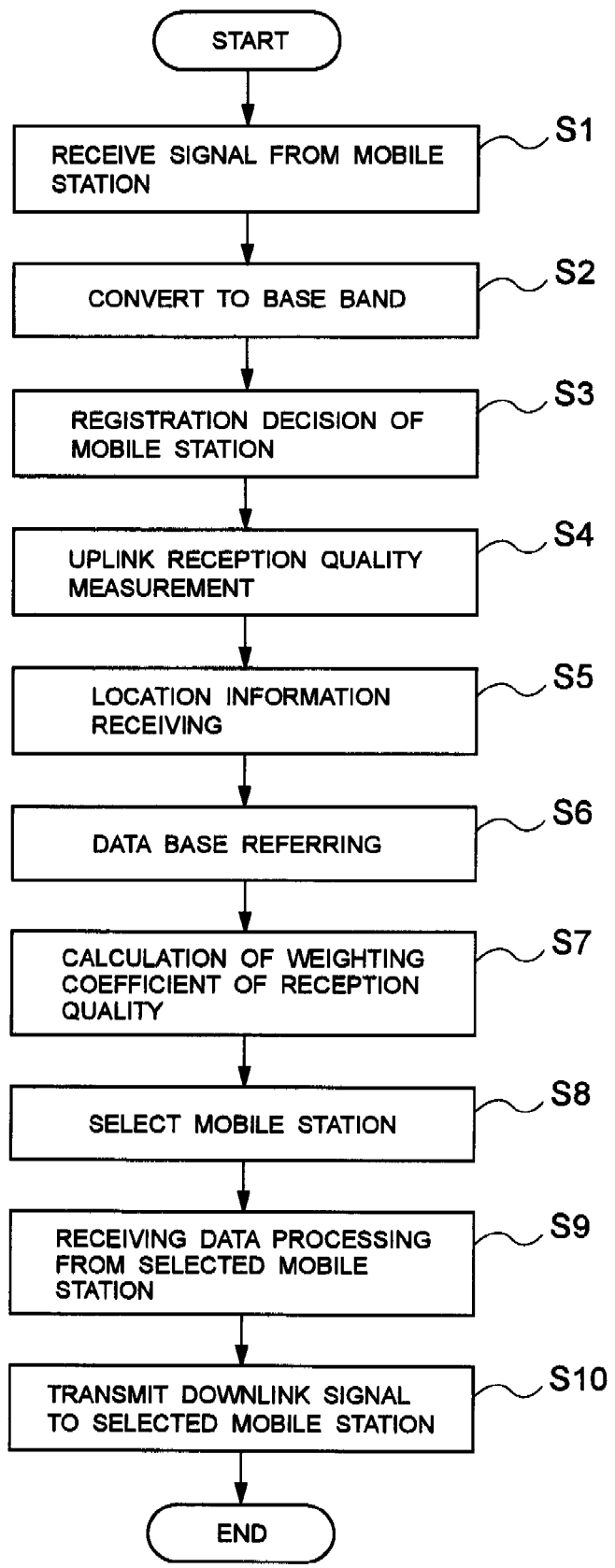
FIG. 4 is a flowchart illustrating an exemplary embodiment of operation of uplink of a base station.
Figure 5:
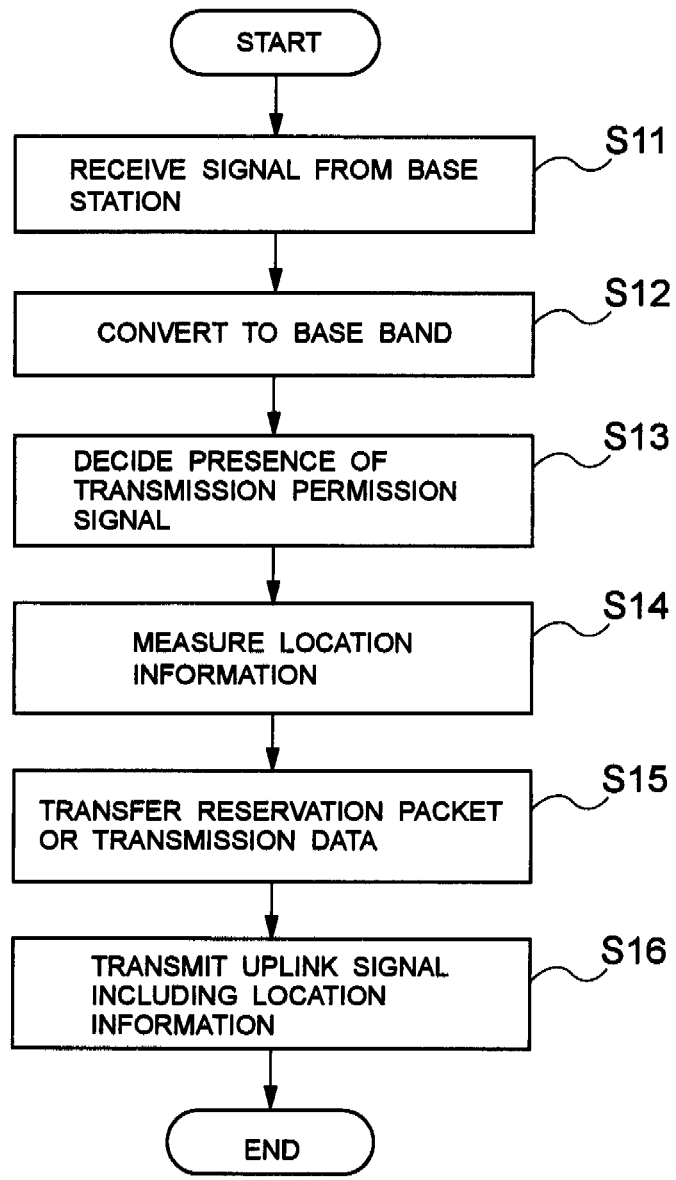
FIG. 5 is a flowchart illustrating an exemplary embodiment of operation of uplink of a mobile station.

Next, operations of the first exemplary embodiment will be specifically described referring to FIG. 1 to FIG. 5. FIG. 3 is an explanatory diagram of an exemplary embodiment of content of the location information data base, FIG. 4 is a flowchart illustrating an exemplary embodiment of operations of the uplink of the base station 1, FIG. 5 is a flowchart illustrating an exemplary embodiment of operations of the uplink of the mobile station 11.

First, an exemplary embodiment of operations of the uplink of the base station 1 will be described. In FIG. 1, the antenna unit 101 receives all signals from the mobile stations 11 to be received by the base station 1 (step S1 of FIG. 4).

The signal receiving unit 102 includes the signal receiving unit 102-1 to 102-N of each mobile station 11, separates the signals received by the antenna unit 101 to signals of each mobile station 11, and converts them to base band signals (step S2 of FIG. 4).

The mobile station registration decision unit 103 determines the presence of the reservation packet for each mobile station 11, and registers the mobile station 11 from which the reservation packet has been received as the mobile station 11 having data to be transmitted (step S3 of FIG. 4). A registration cancel processing (no data to be transmitted) is performed for the mobile station 11 which has notified the termination of the uplink data to be transmitted with uplink signals. The mobile station 11 which has been already registered is registered as the mobile station 11 having data to be transmitted as long as the mobile station registration decision unit 103 does not receive the termination notice from the mobile station 11.

The uplink reception quality measurement unit 105 measures the reception quality of uplink signals to be received of each mobile station 11 (step S4 of FIG. 4). The mobile station location information receiving unit 106 registers the location information of each mobile station 11 notified by uplink signals from the mobile station 11 (step S5 of FIG. 4).

The packet data receiving unit 107 performs the receiving processing of uplink packet data from the mobile station 11 which is permitted by the scheduling processing described below (step S9 of FIG. 4).

The information management unit 108 of each mobile station 11 manages the presence of data to be transmitted, the uplink signal reception quality, and the location information for each mobile station 11 (step S6 and S7 of FIG. 4). The location information of the mobile station 11 is managed as converted to the weighting coefficient of the uplink reception quality based on the location information from the location information data base 112.

The scheduling processing unit 109 obtains the priority of each mobile station 11 from the uplink signal reception quality, and the weighting coefficient of the uplink reception quality based on the location information, selects the mobile station 11 of the highest priority (step S8 of FIG. 4), and notifies the information to the signal transmission unit 110.

The signal transmission unit 110 generates downlink signals to be transmitted for the mobile station 11 selected by the scheduling processing unit 109, and transmits the downlink signals through the antenna unit 101 (step S10 of FIG. 4).

Here, the processing of the location information data base 112 and the scheduling processing unit 109 will be described in more detail. In the location data base 112, the propagation environment of signals at the location is previously measured from plural parameters illustrated in FIG. 3, and the certainty of the uplink reception quality is obtained from the measured result, and is registered as weighting coefficient.

That is, referring to FIG. 3, plural location information within moving range of the mobile station 11, and information of time (e.g. time of every certain time), weather (fine, cloudy, rainy, etc.), temperature (20 degrees, 30 degrees, etc.), or date (month, day, etc.) corresponding to each location information are previously recorded in the location information data base 112. For the location information, and any combination of time, weather, temperature and date corresponding to this location information, "certainty of propagation channel based on location information" (such a certainty that variation in electric wave propagation channel is large or small) is calculated, and the calculated result is recorded as weighting coefficient in the location information data base 112.

This calculation of the weighting coefficient is to measure the condition of propagation channel of the past and same time, weather, temperature and date, and make a data base of the measured result as statistical information.

For example, in such an environment where variation in the propagation environment is very small, it is determined that the certainty of the uplink reception quality is high, and in such an environment where time-dependent variation of the propagation environment is large, it is determined that the certainty of the uplink reception quality is low. Meanwhile, if current information is separately measured, and is reflected to the data base, it is possible to further increase the certainty of the statistical result of the data base.

Next, in an exemplary embodiment of processing of the scheduling processing 109, the priority of the mobile station 11 can be obtained as the following expression by the uplink reception quality of each mobile station 11 and the uplink reception quality based on the location information.

priority of mobile station=uplink reception quality× weighting coefficient of uplink reception quality based on location information If variation in propagation environment of signals is small, this "weighting coefficient of the uplink reception quality based on location information" acts in the plus direction, if the variation in propagation environment is large, it acts in the minus direction.

Next, an exemplary embodiment of operations of uplink of the mobile station 11 will be described. In FIG. 2, the antenna unit 201 receives downlink signals from the base station 1 (step S11 of FIG. 5).

The signal receiving unit 202 converts the received signals to base band signals (step S12 of FIG. 5). When the transmission permission is waited after reservation packet has been transmitted, the transmission permission signal decision unit 203 determines the presence of transmission permission signals notified with downlink signals (step S13 of FIG. 5).

When data to be transmitted with uplink signals exists, the uplink packet data supply unit 208 notifies the presence of the data to the transmission data generation unit 206. When the data is transmitted, the data to be transmitted is transferred.

The location information measurement unit 209 measures its own location information with GPS (Global Positioning System), etc (step S14 of FIG. 5). When new data to be transmitted exists, the transmission data generation unit 206 selects so as to transmit reservation packet, and when the transmission permission is notified after the reservation packet has been transmitted, it notifies so as to transmit data, and transfers the data to be transmitted (step S15 of FIG. 5).

The location information from the location information measurement unit 209 is also notified to the signal transmission unit 207. The signal transmission unit 207 generates uplink signals from information notified by the transmission data generation unit 206, and transmits uplink signals through the antenna unit 201 (step S16 of FIG. 5).

As described above, according to the first exemplary embodiment of the present invention, because the priority of the mobile station 11 is calculated by multiplying the uplink reception quality by the weighting coefficient of the uplink reception quality based on the location information, it is possible to perform uplink scheduling based on the signal reception quality independently of time-dependent variation of signal propagation channel due to environment, location, etc.

[Second Exemplary Embodiment]

Next, the packet communication of downlink will be described. In the base station 1 of FIG. 1, signals received by the antenna unit 101 are received by the signal receiving unit 102 as separated to base band signals of each mobile station 11. Each of signals separated for each mobile station 11 is inputted to the mobile station registration decision unit 103, the downlink reception quality receiving unit 104, and the mobile station location information receiving unit 106.

The mobile station registration decision unit 103 determines the presence and the transmission possibility of a new mobile station 11, notifies the decision result to the information management unit 108 of each mobile station 11. The downlink reception quality receiving unit 104 receives downlink reception quality of each mobile station 11 included in received uplink signals, and notifies the received downlink reception quality to the information management unit 108 of each mobile station 11.

The mobile station location information receiving unit 106 receives the location information of each mobile station 11 included in the received uplink signals, and notifies the received location information to the information management unit 108 of each mobile station 11.

The information management unit 108 of each mobile station 11 extracts the weighting coefficient based on the location information from the location information data base 112 based on the notified location information, and notifies the weighting coefficient, the presence of the new mobile station 11, and the downlink signal reception quality information to the scheduling processing unit 109.

The information management unit 108 of each mobile station 11 receives downlink packet data from the downlink packet data supply unit 111, and notifies it to the scheduling processing unit 109. The scheduling processing unit 109 calculates the priority of each mobile station 11 from the notified information, selects the mobile station 11 of the high priority, and notifies the result and the downlink packet data to be transmitted to the signal transmission unit 110.

The signal transmission unit 110 generates signals for the selected mobile station 11, and transmits the downlink signals through the antenna unit 101.

On the other hand, in the mobile station 11 of FIG. 2, signals inputted to the antenna unit 201 are converted to base band signals by the signal receiving unit 202. The base band signals received by the signal receiving unit 202 are inputted to the downlink reception quality measurement unit 204 and the downlink packet data receiving unit 205. The receiving signal quality measurement unit 204 measures the downlink reception quality, and notifies the measurement result to the transmission data generation unit 206.

If signals received from the base station 1 include packet data, the downlink packet data receiving unit 205 receives the packet data. The location information measurement unit 209 measures the location information of the mobile station 11 itself by means of GPS and the like, and notifies the measured location information to the transmission data generation unit 206. The transmission data generation unit 206 notifies the location information of the mobile station 11 and the downlink reception quality to the signal transmission unit 207. The signal transmission unit 207 generates signals for the base station 1, and transmits uplink signals through the antenna unit 201.

Figure 6:
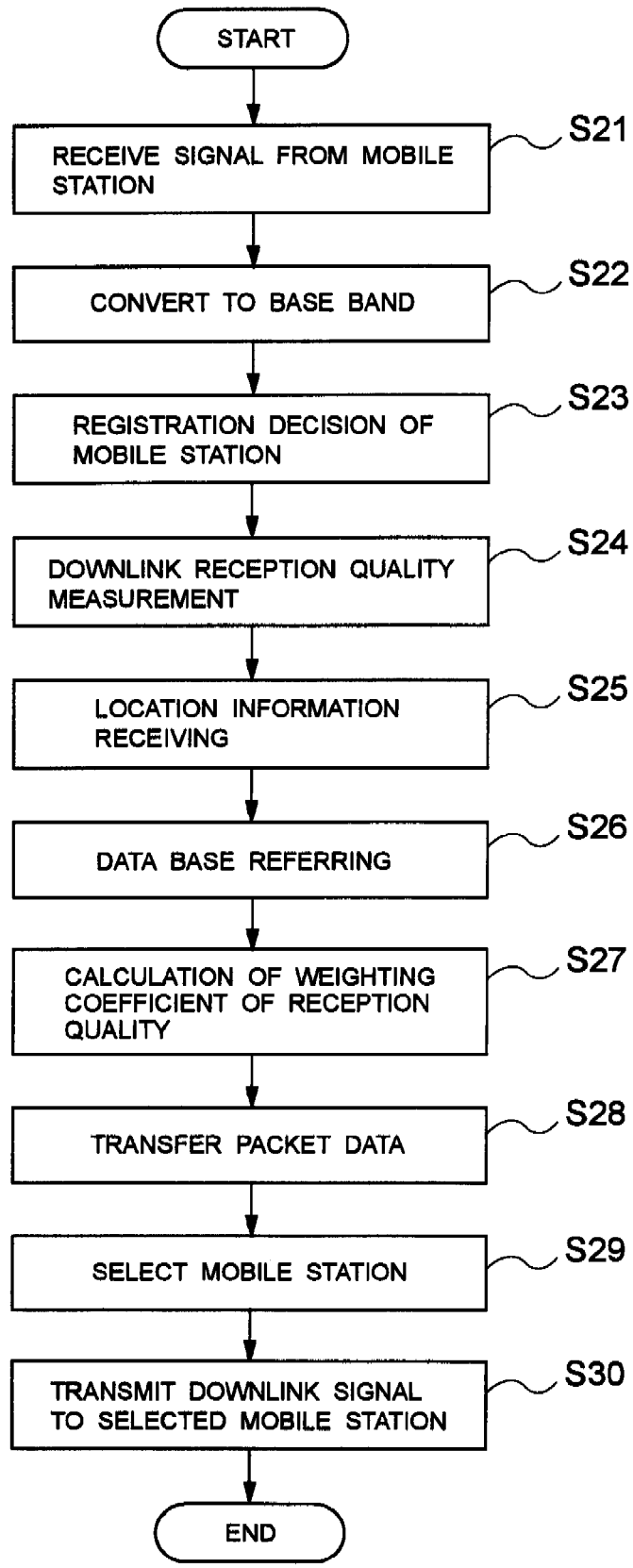
FIG. 6 is a flowchart illustrating an exemplary embodiment of operation of downlink of a base station.
Figure 7:
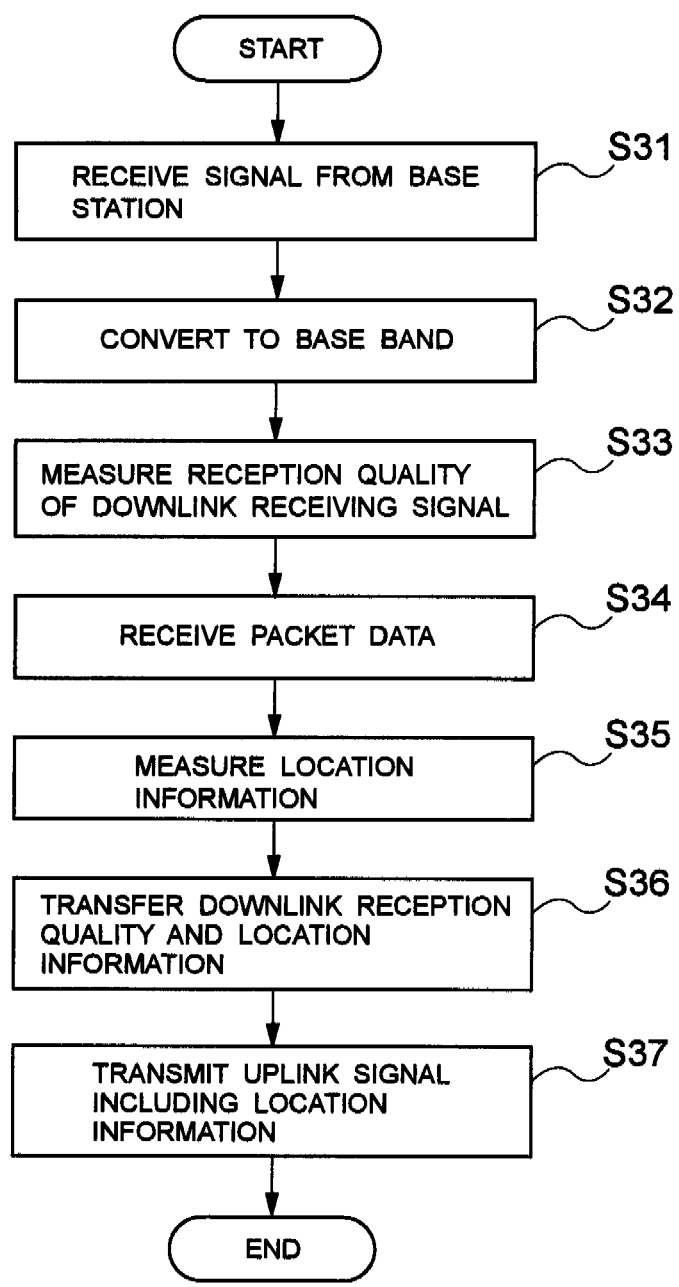
FIG. 7 is a flowchart illustrating an exemplary embodiment of operation of downlink of a mobile station.

Next, operations of the second exemplary embodiment will be specifically described referring to FIG. 1 to FIG. 3 and FIG. 6 to FIG. 7. FIG. 6 is a flowchart illustrating an exemplary embodiment of operations of downlink of the base station 1, FIG. 7 is a flowchart illustrating an exemplary embodiment of operations of downlink of the mobile station 11.

First, an exemplary embodiment of operations of downlink of the base station 1 will be described. In FIG. 1, the antenna unit 101 of the base station 1 receives signals to be received by the base station 1 from all the mobile station 11 (step S21 of FIG. 6).

The signal receiving unit 102 includes the signal receiving units 102-1 to 102-N of each mobile station 11, separates signals received by the antenna unit 101 to signals of each mobile station 11, and converts them to base band signals (step S22 of FIG. 6).

The mobile station registration decision unit 103 determines whether or not each mobile station 11 exists within area of the base station 1 and data can be transmitted, and notifies the information to the information management unit 108 of each mobile station 11 (step S23 of FIG. 6).

The downlink reception quality receiving unit 104 receives the downlink reception quality measured by the mobile station 11 which is notified with uplink signals (step S24 of FIG. 6). The mobile station location information receiving unit 106 receives the location information of each mobile station 11 which is notified with the uplink signals (step S25 of FIG. 6), and notifies it to the information management unit 108 of each mobile station 11.

The information management unit 108 of each mobile station 11 manages the information on the possibility of transmission, the downlink signal reception quality, and the location information for each mobile station 11, and notifies them to the scheduling processing unit 109 (step S26 and S27 of FIG. 6).

The location information of the mobile station 11 is converted to the weighting coefficient of the downlink reception quality based on the location information from the location information data base 112, and is managed. When there is packet data to be transmitted to the mobile station 11 existing within area of the base station 1, the downlink packet data supply unit 111 notifies the information to the scheduling processing unit 109, and transfers the packet data (step S28 of FIG. 6).

The scheduling processing unit 109 obtains the priority of each mobile station 11 from the downlink signal reception quality, and the weighting coefficient of the downlink reception quality based on the location information, selects the mobile station 11 of the highest priority (step S29 of FIG. 6), and notifies the information to the signal transmission unit 110.

The signal transmission unit 110 generates downlink signals to be transmitted from the packet data for the mobile station 11 selected by the scheduling processing unit 109, and transmits the downlink signals through the antenna unit 101 (step S30 of FIG. 6).

Here, the processing of the location information data base 112 and the scheduling processing unit 109 will be described in more detail. In the location information data base 112, propagation environment of signals at the location is previously measured from plural parameters illustrated in FIG. 3, and the certainty of the downlink reception quality is obtained from the measured result, and is registered as weighting coefficient.

For example, in such an environment where variation in propagation environment is very small, it is determined that the certainty of the downlink reception quality is high, and in such an environment where time-dependent variation of propagation environment is large, it is determined that the certainty of the downlink reception quality is low. Next, in an exemplary embodiment of the processing of the scheduling processing unit 109, the priority of the mobile station 11 can be obtained as the following expression with the downlink reception quality of each mobile station 11, and the downlink reception quality based on the location information.

priority of mobile station=downlink reception quality× weighting coefficient of downlink reception quality based on location information If variation in propagation environment of signals is small, this "weighting coefficient of downlink reception quality based on location information" acts in the plus direction, on the other hand, if variation in propagation environment is large, it acts in the minus direction.

Next, operations of the mobile station 11 of FIG. 2 will be described. Referring to FIG. 2, the antenna unit 201 of the mobile station 11 receives downlink signals from the base station 1 (step S31 of FIG. 7).

The signal receiving unit 202 converts the received signals to base band signals (step S32 of FIG. 7). The downlink reception quality measurement unit 204 measures the reception quality of the received downlink signals (step S33 of FIG. 7).

When packet data is transmitted from the base station 1 according to the result of the scheduling, the downlink packet data receiving unit 205 receives the packet data (step S34 of FIG. 7).

The location information measurement unit 209 measures its own location information with GPS (Global Positioning System), etc (step S35 of FIG. 7). The transmission data generation unit 206 transfers the downlink reception quality, and the location information from the location information measurement unit 209 to the signal transmission unit 207 (step S36 of FIG. 7). The signal transmission unit 207 generates signals to be transmitted to the base station 1, and transmits the uplink signals through the antenna unit 201 (step S37 of FIG. 7).

As described above, according to the second exemplary embodiment of the present invention, because the priority of the mobile station 11 is calculated by multiplying the downlink reception quality by the weighting coefficient of the downlink reception quality based on the location information, it is possible to perform downlink scheduling based on the signal reception quality independently of the time-dependent variation of signal propagation channel due to environment, location, etc.

[Third Exemplary Embodiment]

While the basic configuration of the third exemplary embodiment of the present invention is same as that of the above first and second exemplary embodiments, the scheduling method is further devised.

In FIG. 1, while the scheduling processing unit 109 determines the priority using the uplink reception quality and the downlink reception quality, and obtains the priority of the mobile station 11, when the well known Proportional Fairness is used as a method for obtaining the priority, the priority is obtained as the following expression using SIR (Signal to Interference Ratio) as the reception quality.

priority of mobile station=SIR/average of SIR

In this case, because the average value of SIR cannot be obtained just after the mobile station 11 has been registered in the base station 1, the correct priority cannot be obtained. Thus, the data base of the average value of SIR is previously made as the location information and the average value of SIR is registered on the data base, so that the correct priority can be obtained even just after the mobile station 11 has been registered.

AS described above, according to the third exemplary embodiment of the present invention, the same advantages as the first and second exemplary embodiments can be provided in such a case that SIR is used as the reception quality.

That is, according to the first to third exemplary embodiments of the present invention, it is possible to perform the scheduling which selects the best mobile station 11 in the packet communication of the wireless mobile communication.

The reason is that variation in propagation environment of signals depending on environment can be considered by using the location information of the mobile station 11 as parameters of the scheduling.

Meanwhile, it is apparent that the present invention is not limited to the above exemplary embodiments, and each exemplary embodiment can be appropriately modified within the scope of the technical concept of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A packet communication system for packet communication between a base station and a plurality of mobile stations, the base station comprising:

a reception quality obtaining unit which obtains reception quality of uplink signal (signal in the direction from the mobile station to the base station) or reception quality of downlink signal (signal in the direction from the base station to the mobile station);

a location information obtaining unit which obtains location information of the mobile station;

a location information data base in which certainty of a reception quality is registered, wherein the certainty is a weighting coefficient which is obtained from combination of a prescribed location within a moving range of the mobile station and propagation environment for the location; and a mobile station selection unit which selects a mobile station, out of the plurality of mobile stations, intended to transmit or receive signals based on result of multiplying the reception quality obtained by the reception quality obtaining unit, by the weighting coefficient registered in the location information data base.

2. The packet communication system according to claim 1, wherein the location information, at least one of time information, weather information, temperature information, and date information, and the weighting coefficient are associated with each other and recorded in the location information data base.

3. The packet communication system according to claim 1, wherein SIR (Signal to Interference Ratio) is used as the reception quality.

4. The packet communication system according to claim 1, wherein if the propagation environment of a first mobile station has a maximum variation over time, the weighting coefficient is negative, and the mobile station selection unit is less likely to select the first mobile station as the mobile station intended to transmit or receive signals, and if the propagation environment of the first mobile station has a minimum variation over time, the weighting coefficient is positive, and the mobile station selection unit is more likely to select the first mobile station as the mobile station intended to transmit or receive signals.

5. A packet communication method for packet communication between a base station and a plurality of mobile stations in a packet communication system, comprising in the base station:

obtaining a reception quality of uplink signal (signal in the direction from a mobile station to the base station) or a reception quality of downlink signal (signal in the direction from the base station to the mobile station);

obtaining location information of the mobile station;

referring to a location information data base in which a certainty of a reception quality is registered, wherein the certainty is a weighting coefficient which is obtained from combination of a prescribed location within a moving range of the mobile station and propagation environment for the location; and selecting a mobile station, out of the plurality of mobile stations, intended to transmit or receive signals based on a result of multiplying the reception quality obtained at the process of obtaining the reception quality, by the weighting coefficient registered in the location information data base.

6. The packet communication method according to claim 5, wherein the location information, at least one of time information, weather information, temperature information, and date information, and the weighting coefficient are associated with each other and recorded in the location information data base.

7. The packet communication method according to claim 5, wherein SIR (Signal to Interference Ratio) is used as the reception quality.

8. The packet communication method according to claim 5, wherein if the propagation environment of a first mobile station has a maximum variation over time, the weighting coefficient is negative, and the selecting the mobile station comprises not selecting the first mobile station as the mobile station intended to transmit or receive signals, and if the propagation environment of the first mobile station has a minimum variation over time, the weighting coefficient is positive, and the selecting the mobile station comprises selecting the first mobile station as the mobile station intended to transmit or receive signals.

9. A base station in a packet communication system for packet communication between a base station and a plurality of mobile stations, comprising:

a reception quality obtaining unit which obtains a reception quality of uplink signal (signal in the direction from a mobile station to the base station) or a reception quality of downlink signal (signal in the direction from the base station to the mobile station);

a location information obtaining unit which obtains location information of the mobile station;

a location information data base in which a certainty of a reception quality is registered, wherein the certainty is a weighting coefficient which is obtained from combination of a prescribed location within a moving range of the mobile station and propagation environment for the location; and a mobile station selection unit which selects a mobile station, out of the plurality of mobile stations, intended to transmit or receive signals based on a result of multiplying the reception quality obtained by the reception quality obtaining unit, by the weighting coefficient registered in the location information data base.

10. The base station according to claim 9, wherein the location information, at least one of time information, weather information, temperature information, and date information, and the weighting coefficient are associated with each other and recorded in the location information data base.

11. The base station according to claim 9, wherein SIR (Signal to Interference Ratio) is used as the reception quality.

12. The base station according to claim 9, wherein if the propagation environment of a first mobile station has a maximum variation over time, the weighting coefficient is negative, and the mobile station selection unit is less likely to select the first mobile station as the mobile station intended to transmit or receive signals, and if the propagation environment of the first mobile station has a minimum variation over time, the weighting coefficient is positive, and the mobile station selection unit is more likely to select the first mobile station as the mobile station intended to transmit or receive signals.

13. A packet communication system for packet communication between a base station and a plurality of mobile stations, the base station comprising:

reception quality obtaining means obtaining a reception quality of uplink signal (signal in the direction from a mobile station to the base station) or a reception quality of downlink signal (signal in the direction from the base station to the mobile station);

location information obtaining means obtaining location information of the mobile station;

a location information data base in which a certainty of a reception quality is registered, wherein the certainty is a weighting coefficient which is obtained from combination of a prescribed location within a moving range of the mobile station and propagation environment for the location; and mobile station selection means selecting a mobile station, out of the plurality of mobile stations, intended to transmit or receive signals based on a result of multiplying the reception quality obtained by the reception quality obtaining means, by the weighting coefficient registered in the location information data base.

14. The packet communication system according to claim 13, wherein if the propagation environment of a first mobile station has a maximum variation over time, the weighting coefficient is negative, and the mobile station selection unit is less likely to select the first mobile station as the mobile station intended to transmit or receive signals, and if the propagation environment of the first mobile station has a minimum variation over time, the weighting coefficient is positive, and the mobile station selection unit is more likely to select the first mobile station as the mobile station intended to transmit or receive signals.

15. A base station in a packet communication system for packet communication between a base station and a plurality of mobile stations, comprising:
    reception quality obtaining means obtaining a reception quality of uplink signal (signal in the direction from a mobile station to the base station) or a reception quality of downlink signal (signal in the direction from the base station to the mobile station);
    location information obtaining means obtaining location information of the mobile station;
    a location information data base in which a certainty of a reception quality is registered, wherein the certainty is a weighting coefficient which is obtained from combination of a prescribed location within a moving range of the mobile station and propagation environment for the location; and
    mobile station selection means selecting a mobile station, out of the plurality of mobile stations, intended to transmit or receive signals based on a result of multiplying the reception quality obtained by the reception quality obtaining means, by the weighting coefficient registered in the location information data base.

16. The base station according to claim 15, wherein if the propagation environment of a first mobile station has a maximum variation over time, the weighting coefficient is negative, and the mobile station selection unit is less likely to select the first mobile station as the mobile station intended to transmit or receive signals, and if the propagation environment of the first mobile station has a minimum variation over time, the weighting coefficient is positive, and the mobile station selection unit is more likely to select the first mobile station as the mobile station intended to transmit or receive signals.

* * * * *